United States Patent [19]
Bishop et al.

[11] 3,818,314
[45] June 18, 1974

[54] FREQUENCY CONTROLLED INVERTER

[75] Inventors: John Daniel Bishop, Morris Twp., Morris County; Robert John Kakalec, Madison; Gerard Edward Miller, West Orange, all of N.J.

[73] Assignee: Bell Telephone Laboratories, Incorporated, Murray Hill, Berkeley Heights, N.J.

[22] Filed: June 11, 1973

[21] Appl. No.: 368,757

[52] U.S. Cl............................................. 321/45 R
[51] Int. Cl.......................................... H02m 7/52
[58] Field of Search.................... 321/45 R; 323/60; 331/113 A

[56] References Cited
UNITED STATES PATENTS

| | | | |
|---|---|---|---|
| 3,230,476 | 1/1966 | Massey | 331/113 A |
| 3,281,716 | 10/1966 | Brown | 331/113 A |
| 3,341,766 | 9/1967 | Rhyne, Jr. | 323/60 X |
| 3,398,292 | 8/1968 | Kuba | 323/60 X |
| 3,403,319 | 9/1968 | Tate | 331/113 A X |
| 3,573,605 | 4/1971 | Hart et al. | 323/60 X |
| 3,584,289 | 6/1971 | Bishop et al. | 331/113 A X |
| 3,590,362 | 6/1971 | Kakalec | 321/45 R |
| 3,699,424 | 10/1972 | Hart et al. | 321/11 |
| 3,739,257 | 6/1973 | Hunter | 323/60 |

*Primary Examiner*—William M. Shoop, Jr.
*Attorney, Agent, or Firm*—Joseph A. Cameron

[57] ABSTRACT

In a regulated dc to dc converter, a ferroresonant regulator is combined with a push-pull inverter on the same transformer, and a feedback circuit controls the frequency of the inverter in response to the rectified output of the regulator. A control winding on the inverter transformer is tightly coupled to the base drive windings that supply drive to the inverter transistors and loosely coupled to the primary winding that is driven by the transistors. The control winding is short circuited each half cycle at a time determined by the feedback circuit to reflect a low impedance into the base drive windings and a higher inductive impedance into the primary winding. The higher inductive impedance in combination with a capacitor in parallel with the primary winding forms a resonant circuit which insures efficient commutation of the inverter transistors and the control winding short circuiting device.

8 Claims, 3 Drawing Figures

FREQUENCY CONTROLLED INVERTER

BACKGROUND OF THE INVENTION

This invention relates to the field of electrical power processing, particularly to inverters for converting direct current to alternating current.

As electronic systems have become more complex, they have begun to require many different voltages with some degree of regulation. Previously, this requirement was met by one large regulated voltage supply dropped through various resistors to supply the individual voltage needs. With the availability of inexpensive, efficient switching semiconductors, however, it has become feasible to provide individually regulated supplies for each required voltage. Lower power dc to dc converters therefore have become very much in demand. Because of the large number of them that may be used in a single system, however, it is quite important that they be efficient, not only because of total power usage but also because of the generation of heat, which is of itself detrimental to so much of the circuitry of the system.

U.S. Pat. No. 3,590,362, which issued to R. J. Kakalec on June 29, 1971, discloses a useful dc to dc converter that includes an inverter and a ferroresonant regulator. Since the output of a ferroresonant regulator is a function of frequency, the converter is easily regulated by control of the inverter frequency. The Kakalec circuit accomplishes such control by switching an inductor across a control winding of the inverter transformer to terminate each half cycle of inverter output.

While the Kakalec circuit is quite useful for its intended purpose, inverter switching takes place during a burst of transistor current. This causes not only power loss and heat generation, but also, because of the resulting stress on the inverter transistors, potential circuit failure.

An object of this invention is an improved inverter which eliminates the transistor current burst of the Kakalec circuit.

Another object is a reliable and efficient inverter.

Another object is a dc to dc converter with improved reliability and efficiency.

SUMMARY OF THE INVENTION

In an inverter of the type wherein a pair of switching transistors drive a transformer primary winding in push-pull configuration, a pair of base drive windings in turn drive the transistors, and a switching circuit cooperates with a control winding on the transformer to initiate commutation, the switching circuit operates to reflect a low impedance into the base drive windings, and a higher inductive impedance into the primary winding. The low impedance rapidly turns off the conducting transistor, while the higher inductive impedance limits changes in the transistor collector currents at commutation. This combination of desired impedances is readily accomplished if the control winding is tightly coupled to the base drive windings and loosely coupled to the primary winding, and the switching circuit operates to short circuit the control winding. Commutation is further improved by the addition of a capacitor across the primary winding to resonate with the primary leakage inductance.

DETAILED DESCRIPTION

Figure 1:
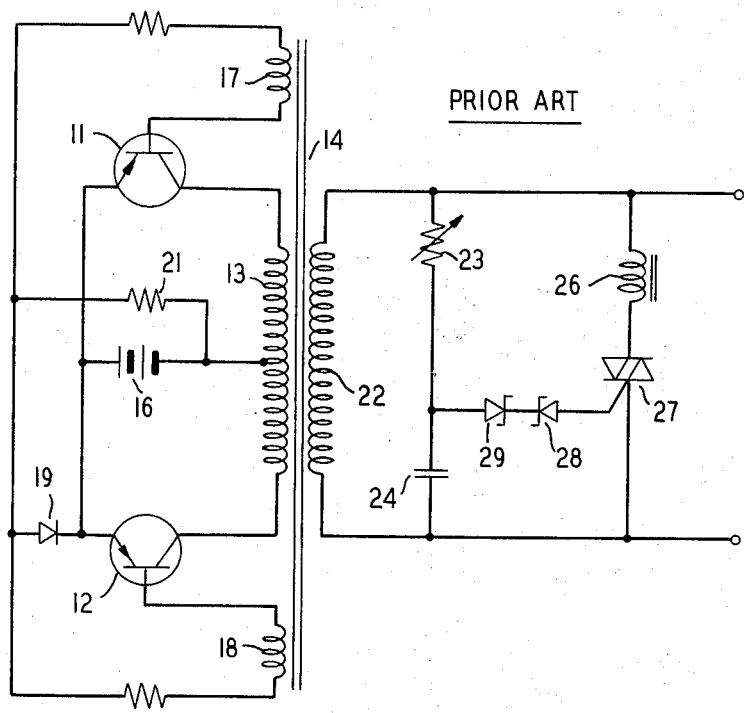
FIG. 1 is a schematic diagram of the Kakalec circuit of the prior art.

In the Kakalec inverter circuit shown in FIG. 1 and labeled prior art, a pair of switching transistors 11 and 12 are connected to the center tapped primary winding 13 of transformer 14 in push-pull configuration. A dc voltage source 16 is connected from the transistor emitters to the center tap of winding 13. A pair of base drive windings 17 and 18 connect the bases and emitters of the respective transistors through individual resistors and a common diode 19. A starting resistor 21 connects the emitter-base current paths across source 16. A control winding 22 is tightly coupled to windings 13, 17, and 18, and is shunted by the series combinations of an integrating resistor 23 and an integrating capacitor 24, and a switching inductance 26 and a bidirectional semiconductor switch, or triac 27. The gate of triac 27 is connected through a pair of oppositely poled zener diodes 28 and 29 to the junction between resistor 23 and capacitor 24. Additional transformer windings can be used for output in the conventional manner.

The operation of the circuit of FIG. 1 to produce a square wave output can be described as follows:

A small amount of current is driven by source 16 through both transistor base-emitter junctions, their respective base drive windings and starting resistor 21. This allows a small amount of collector current to flow in each transistor through the respective halves of primary winding 13. Small differences between transistor or circuit characteristics cause a net voltage of one polarity to develop across winding 13. This in turn induces a voltage across windings 17 and 18 to bias one transistor on and the other off in the usual inverter starting manner. Assuming transistor 11 to be biased on, as its collector current increases, the voltage induced in winding 17 increases to drive transistor 11 into saturation. Almost the entire voltage of source 16 then appears across one half of winding 13. By transformer action an almost constant voltage is induced in control winding 22. This nearly constant voltage is integrated by integrating resistor 23 and capacitor 24. The voltage across capacitor 24 therefore increases linearly until it reaches the value required to break down reverse-biased zener diode 28 or 29 and fire triac 27. The firing of triac 27 places inductor 26 across winding 22 and, through transformer action, effectively places it across windings 17, 18 and 13. The lower impedance reflected across winding 17 shunts the drive signal to reduce the drive voltage to transistor 11 and bring it out of saturation. Once transistor 11 is out of saturation, the current through winding 13 begins to fall, reversing the voltage induced in windings 17 and 18. This reversed base drive voltage turns transistor 11 off and transistor 12 on to start a new half cycle of ouptut. The lower impedance inductance reflected into the primary and base drive windings of transformer 14 therefore simulates core saturation of the well-known saturating core inverter.

When the triac is first fired, however, reflecting the lower impedance into the base drive winding, it also reflects a lower impedance into the primary winding 13. Since transistor 11 is at that instant in saturation, the immediate effect of the lower impedance is a rapid rise in primary winding current driven by source 16. This higher current must then be switched off as the base drive is reduced and finally reversed. Since significant power dissipation occurs within the transistor during the switching period, the higher the current that must be switched on and off, the higher the dissipation and the higher the stress on the transistor.

Unfortunately, the range of workable values for inductor 26 and hence the range of impedance reflected into the primary winding is limited. If inductance 26 is too high, the firing of triac 27 does not lower the drive enough to terminate the half cycle of the inverter; if it is too low, the peak collector power dissipation becomes excessive.

We have found, according to our invention, that the switching transistors can be more rapidly turned off without a corresponding increase in collector current and therefore without an increase in transistor stress if the proper impedances are reflected into windings 13, 17 and 18 by the firing of triac 27. What is needed however, is a very low impedance reflected into base drive windings 17 and 18 and a moderately higher inductive impedance reflected into primary winding 13. These required impedances may be reflected into the respective windings by the combination of tight coupling between winding 22 and windings 17 and 18 and loose coupling between winding 22 and winding 13, with inductance 26 replaced by a short circuit; the inverter then commutates as follows:

When triac 27 fires, the resulting short circuit across control winding 22 is reflected as an approximate short circuit across base drive winding 17. This short circuit rapidly reduces base current in transistor 11 to pull the transistor out of saturation. In the mean time, the looser coupling between control winding 22 and primary winding 13 causes, upon firing of triac 27, only a slight reduction in the impedance reflected into the primary winding. Since the collector current of transistor 11 is limited when the transistor is in saturation solely by the impedance of winding 13, the relatively unchanged impedance of winding 13 due to the loose coupling precludes the rapid increase of current just before switching as experienced by the prior circuit. Because the triac effectivley shorts the base drive windings, it is of course necessary for the triac to turn off to allow base drive to turn on the off transistor and complete commutation. If there is not enough capacitance in the transformer windings and transistors, a capacitor may be connected across winding 13 to resonate with the higher inductance to facilitate reversing the transformer voltage and turning off the triac. Transistor 11 may therefore be rapidly and smoothly turned off without significant turn-off stress.

Figure 2:
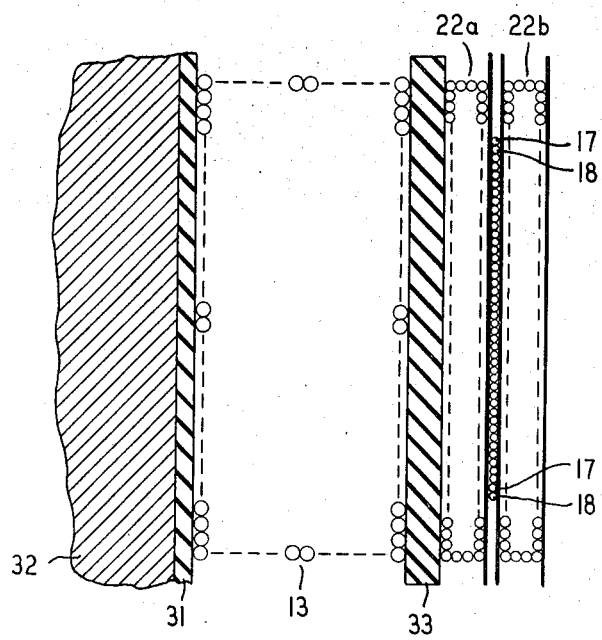
FIG. 2 is a cross section view of a winding assembly which can be used to implement the invention.

One useful physical arrangement for accomplishing the desired combination of coupling is shown in FIG. 2 as a cross section through half of a coil assembly of transformer 14. Winding 13, comprising many layers, is wound directly on a coil form 31 into which is later inserted iron core 32. Many layers of insulation are wound on top of winding 13 to form an insulating thickness 33. Control winding 22 is split into two halves; one half 22A is wound directly on top of insulator 33. Windings 17 and 18 are then wound together on top of winding 22A, separated by only enough insulation to provide the required immunity to voltage breakdown. Finally, on top of windings 17 and 18 is placed winding 22B, the other half of control winding 22. Windings 17 and 18 are therefore closely surrounded by winding 22 to provide the required tight coupling, while winding 13 is separated by a thickness of insulation.

The insulation thickness separating winding 13 for optimum performance may be readily determined empirically. Too little thickness, of course, introduces too little leakage inductance, causing high peak transistor currents just before switching. As the spacing increases, the leakage inductance increases, slowing down the switching process. Too great a spacing therefore causes too much dead time when neither transistor is conducting.

Figure 3:
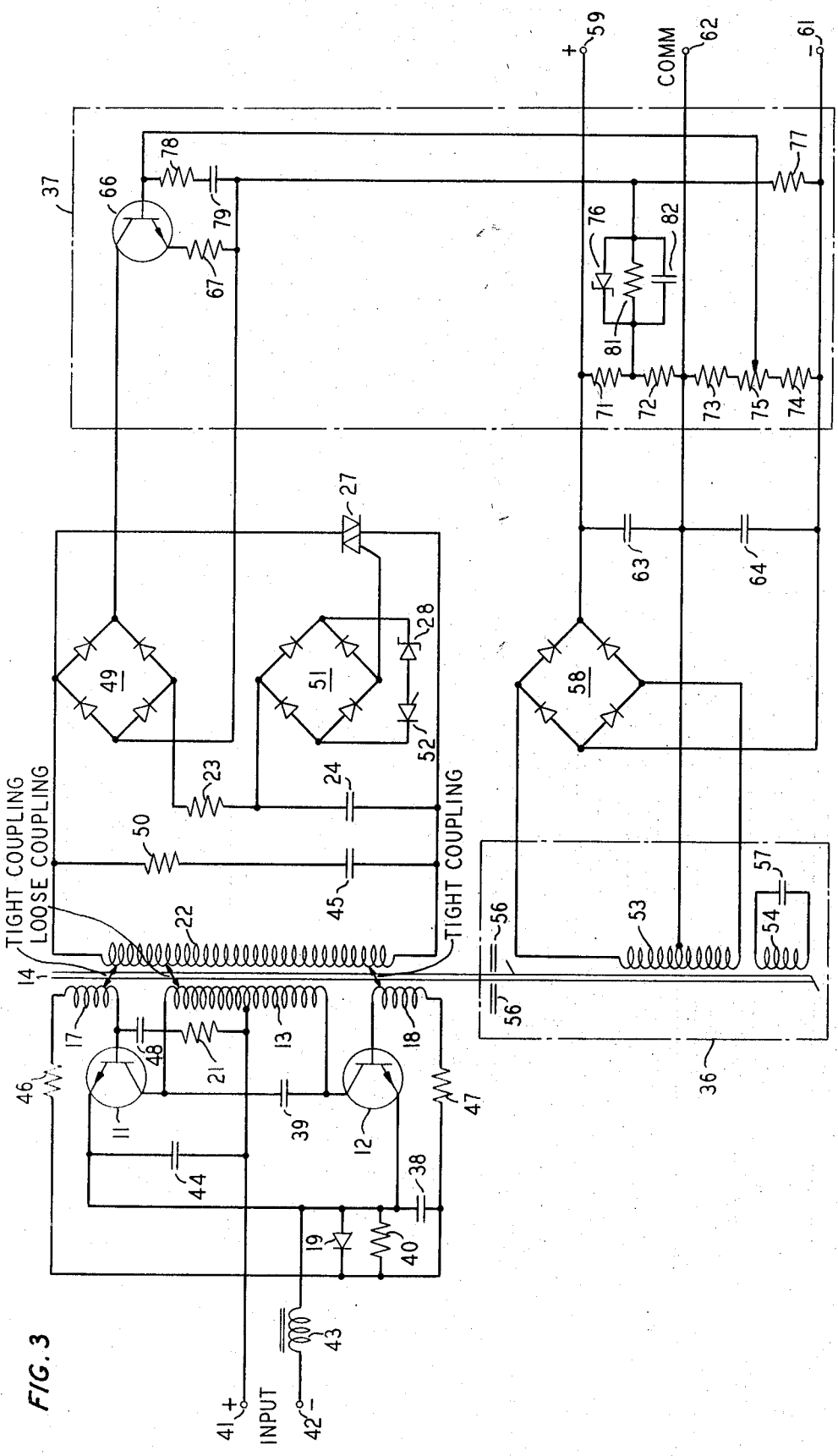
FIG. 3 is a schematic diagram of a particularly useful embodiment of the invention forming a dc to dc converter.

A particularly useful circuit embodying the principles of the invention is shown in the schematic diagram of FIG. 3. This regulated dc to dc converter includes, in addition to a frequency controlled inverter, a ferroresonant regulator 36 and a feedback network 37 for controlling the inverter frequency in response to the regulator output voltage.

In the inverter portion of the circuit of FIG. 3, transformer 14 includes center tapped winding 13, base drive windings 17 and 18 and control winding 22, all wound on the same core. Control winding 22 is, of course, tightly coupled to windings 17 and 18 and loosely coupled to winding 13, and triac 27 is connected directly across winding 22. Although it is not necessary to this invention, windings 13, 17, 18 and 22 may be wound in one coil assembly arranged according to FIG. 2. Alternatively, for example, winding 22 may be tightly coupled to windings 17 and 18, and winding 13 may be somewhat decoupled therefrom by a magnetic shunt. Transistors 11 and 12 are connected in the classical push-pull manner to drive winding 13. That is, the center tap of winding 13 is connected to an input terminal 41 for connection to a dc source. The ends of winding 13 are connected to respective transistor collectors. The transistor emitters are connected to the other input terminal 42; and each base drive winding 17, 18 is connected between base and emitter of its respective transistor through an individual current limiting resistance 46, 47 and a common diode 19. An L-section filter comprising an inductor 43 and a capacitor 44 may be inserted between the source and the inverter in the usual manner to prevent the ac generated by the inverter from feeding back into the dc power source.

The circuit of FIG. 3 includes a resonating capacitor 39 connected across primary winding 13. As previously indicated, this capacitor appreciably helps to turn off the triac. When triac 27 fires, the resulting short circuit across winding 22 causes winding 13 to present an impedance equivalent to the leakage inductance between windings 13 and 22. That impedance is large enough to store considerable energy while the triac is conducting; the energy must go somewhere to enable the transformer current to reverse and the triac to turn off. Capacitor 39 is therefore included in the circuit to ring with the leakage inductance and alternately store the energy. Its value is chosen to provide one-half cycle of oscillation having a duration equal to the desired switching time. Once the voltage across capacitor 39 and winding 13 reverses, the current in winding 22 also reverses to turn off triac 27. When triac 27 turns off, the voltage in winding 17, 18 and 22 abruptly increases until current flows in the base lead of transistor 12.

The inverter portion of FIG. 3 includes two additional features that cooperate with the control arrangement of the invention to further improve inverter operation. A commutating capacitor 38 and a resistor 40 are connected across diode 19, and a starting capacitor 48 is connected in series with starting resistor 21 between input terminal 41 and the base of transistor 11.

To better understand the function of commutating capacitor 38 and resistor 40, consider steady state operation with transistor 11 conducting. Conventional current from source terminal 41 passes through winding 13 and transistor 11 to source terminal 42. By transformer action, a voltage is induced in winding 17 positive at its end connected to transistor 11. This voltage drives a current through the base-emitter junction of transistor 11, diode 19 and base current limiting resistor 46. Commutating capacitor 38 therefore charges up to the forward voltage drop across diode 19. When triac 27 fires, reflecting a short circuit into winding 17 and 18, commutating capacitor 38 acts like a voltage source, maintaining a reverse bias on the off transistor (in this case, transistor 12) and providing a source for reverse base current to the on transistor (transistor 11). Hence, it accelerates the turning off of transistor 11, by sweeping out its stored charge and holds transistor 12 off to prevent the possibility of both transistors conducting at the same time. Diode 19 clamps the voltage to which capacitor 38 charges to a constant maximum, and resistor 40 provides a path around diode 19 for collector leakage current Ico. Its value is chosen according to usual practice to prevent transistor runaway in case the inverter stops operating because of unusual input or output conditions.

The change in the starting circuit is necessitated by the addition of capacitor 38. The prior art circuit of FIG. 1 shows starting resistor 21 connected between the center tap of winding 13 and the junction between both base drive circuits. With the addition of capacitor 38, however, such a connection forces capacitor 38 to charge initially in the wrong polarity, providing a source of voltage that tends to keep both transistors on during the switching intervals of the first few cycles of operation. This current overlap tends to over stress the transistors. In the inverter of FIG. 3, therefore, starting resistor 21 is connected from the center tap of winding 13 to the base of transistor 17 through a dc blocking capacitor 48. When dc voltage is applied to terminals 41 and 42, therefore, a surge of current flows from the source through resistor 21 and capacitor 48 to the base-emitter junction of transistor 11 to start operation reliably without reverse charging capacitor 38.

In the triac firing portion of the inverter of FIG. 3, a first bridge rectifier 49 is inserted in series with resistor 23 to permit a single transistor to function as an ac current source. One ac terminal of a second bridge rectifier 51 is connected to the gate of triac 27; the other is connected to the junction between integrating capacitor 24 and resistor 23. A zener diode 28 and a four-layer p-n-p-n device 52 are connected in series across the bridge dc terminals. A sufficient voltage of either polarity across integrating capacitor 24 therefore applies reverse breakdown potential across zener diode 28 and forward breakdown potential across four-layer device 52. As is well known, the four-layer device passes a sharp pulse upon breakdown, excellent for firing a triac. As a result, any timing asymmetry that might be caused by unequal forward and reverse breakdown characteristics of the breakdown devices is avoided.

The firing portion of the inverter circuit of FIG. 3 also includes a "snubber" circuit; a capacitor 45 and a resistor 50 are connected in series across winding 22 in a conventional manner to dampen voltage oscillations that might otherwise cause triac 27 to prefire.

The ferroresonant regulator portion 36 of the dc to dc converter of FIG. 3 may be of the well-known standard variety. An output winding 53 and a resonating winding 54 are wound on the same core as the inverter winding assembly, but are decoupled by magnetic shunts 56. A ferrocapacitor 57 is connected across winding 54. In operation, the portion of the transformer core linking windings 53 and 54 saturates each half cycle. Upon saturation, winding 54 presents a low impedance to allow ferrocapacitor 57 to discharge and recharge in opposite polarity in a ringing half cycle. This results in an output voltage across winding 53 the magnitude of which varies in proportion to the inverter frequency. A diode bridge 58 may be connected across output transformer 53 to provide rectified output, positive at terminal 59 and negative at terminal 61 with respect to common terminal 62 connected to the center tap of winding 53. In addition, a pair of filter capacitors may be connected between respective output terminals and common terminal 62 to reduce output ripple.

When an inverter embodying the principles of our invention is coupled by the transformer core to a ferroresonant regulator as shown in FIG. 3, there is interaction between the triac switching circuit and the ferroresonant output circuit. As a consequence, too great a leakage inductance between windings 13 and 22 can result not only in long dead time and inefficiency, but also in irregular operation of the triac. The amount of leakage inductance between windings 13 and 22 is therefore chosen for smooth, consistent commutation.

The feedback portion 37 of the dc to dc converter of FIG. 3 operates to change the operating frequency of the inverter to keep the converter output voltage constant. It includes an error detector for detecting changes in output voltage and a controllable current source in the integrator of the triac firing circuit for varying the firing time of the triac in response to the output voltage changes. The controllable current source is advantageously in the form of a transistor 66 connected across the dc terminals of bridge 49 through emitter-biasing resistor 67.

For converters with a single output voltage, the error detector may be of the usual variety with a reference voltage source, commonly a zener diode, and a voltage divider to sense a portion of output voltage. With a dual voltage output, the arrangement shown in FIG. 3 can be an advantage. Resistors 71 and 72 connected between positive output terminals 59 and common terminal 62 form a voltage divider for sensing changes in positive output voltage. Resistors 73 and 74 and variable resistor 75 connected in series between negative output terminal 61 and common terminal 62 form a variable voltage divider for sensing changes in negative output voltage and for adjusting positive and negative output voltage. A zener diode 76 is connected from the junction between resistors 71 and 72 to negative output terminal 61 through its biasing resistor 77. Resistors 71, 72 and 77 are of course, chosen to cause the zener diode to operate within its voltage regulating reverse breakdown range. The anode of zener diode 76 is connected to the end of an emitter-biasing resistor 67 remote from the emitter of transistor 66, and the base of transistor 66 is connected to the junction between resistors 73 and 75.

The overall dc to dc converter circuit operates to provide regulated output voltage as follows: assume the positive output voltage on terminal 59 begins to fall, caused by an increase in load or a drop in input voltage to terminals 41 and 42. A portion of the voltage drop as determined by the ratio between resistors 71 and 72 is fed undiminished through zener diode 76 to the emitter of transistor 66. With no change in negative output voltage, the base voltage of transistor 66 remains constant. Transistor 66 therefore becomes more conductive, causing integrating capacitor 24 to charge more quickly. Triac 27 therefore fires after a shorter time interval to increase the inverter frequency. The output voltage across output winding 53 is increased as a result of the ferroresonant transformer action, and therefore the output voltage to terminals 59 and 61 is increased to offset the initial decrease. In a similar manner, a decrease in negative output voltage at terminal 61 produces a less negative voltage on the base of transistor 66 to increase that transistor's conduction and increase the inverter frequency and thereby offset the initial drop in output voltage.

The relative values of resistors 71, 72, 73, 74 and 77 therefore determine the sensitivity of the feedback circuit to individual changes in the positive and negative outputs. Thus they may be proportioned to set the sensitivity as desired.

Resistors 78 and capacitor 79 might be placed in series between the base of transistor 66 and the anode of zener diode 76 to reduce hunt. The parallel combination of a resistor 81 and a capacitor 82 may be connected across zener diode 76 for the opposite reason, that is, to generate a type of hunt. If the ferroresonant transformer is operating near its peak output, an increase in operating frequency may cause a slight decrease in output voltage. Resistor 81 and capacitor 82 connected as shown add enough time delay in the feedback circuit to cause the inverter frequency to hunt back and forth over the output voltage peak to keep the feedback in the stable negative range when the load is within the normal range of the ferroresonant transformer.

The circuit of FIG. 3, therefore, utilizes our invention to produce a regulated output voltage. The inverter commutates smoothly and efficiently without high switching currents or transient voltages to stress the transistors.

It is to be understood, of course, that our invention is not limited to the circuits and constructions shown. Other arrangements, such as multiple switching devices and transformer constructions that use magnetic shunts rather than insulation thicknesses for reflection of proper impedances in the inverter transformer windings, may be used without departing from the spirit and scope of the invention.

We claim:

1. An inverter of the type comprising a pair of switching transistors each having a transconductive path and a biasing path, a transformer having a multiplicity of windings including at least a center tapped primary winding interconnecting said transconductive paths and a pair of base drive windings, each of said base drive windings connected in series with a respective one of said biasing paths, and switching means connected to at least one of said multiplicity of windings and effective when operated to complete a current path to initiate reversal of the direction of current in said windings, CHARACTERIZED IN THAT said base drive windings are loosely coupled to said primary winding and operation of said switching means completes a low impedance path across said at least one winding to reduce the effective impedance across said base drive windings to a low value and the effective impedance across said primary winding to a higher inductive value.

2. An inverter of the type comprising a pair of switching transistors each having a transconductive path and a biasing path, a transformer having a center tapped primary winding interconnecting said transconductive paths, a pair of base drive windings, each of said base drive windings connected in series with a respective one of said biasing paths, and a control winding, and switching means cooperating with said control winding to couple impedances to said primary windings to initiate reversal of current in said transformer windings, CHARACTERIZED IN THAT said control winding is tightly coupled to said base drive windings and loosely coupled to said primary winding, and said switching means operates to substantially short circuit said control winding, thereby reflecting a low impedance into said base drive windings and a higher inductive impedance into said primary winding.

3. An inverter as in claim 2 including a capacitor connected across said primary winding for resonating with said higher inductive impedance to facilitate said transformer winding current reversal.

4. An inverter as in claim 3 wherein said primary control and base drive windings are concentric, said control winding being spaced from said primary winding, and said base drive windings being imbedded in said control winding.

5. An inverter as in claim 3 including the parallel combination of a diode and a capacitor connected in a path common to both of said biasing paths for preventing current overlap during commutation of said switching transistors.

6. An inverter as in claim 5 including a starting capacitor and a starting resistor connected in series between the center tap of said primary winding and the base of one of said switching transistors to reliably start said inverter.

7. A dc to dc converter comprising a pair of switching transistors each having a transconductive path and a biasing path, a transformer having a linear core portion and a saturating core portion, a center tapped primary winding wound on said linear core portion and interconnecting said transconductive paths, first and second base drive windings wound on said linear core portion, each of said base drive windings being connected in series with a respective biasing path, a control winding closely coupled to said base drive windings and loosely coupled to said primary winding, switching means connected across said control winding for periodically short circuiting said control winding to reflect a low impedance into said biasing windings and a higher inductive impedance into said primary winding and initiate reversal of current in said windings, an output winding wound on said saturating core portion, decoupling means partially decoupling said output windings from said primary winding, a ferrocapacitor coupled to said output winding, rectifying means connected to said output winding to provide a dc output, and feedback means connected between said dc output and said switching means for controlling the operation of said switching means in response to the voltage at said dc output to effect voltage regulation.

8. A dc to dc converter as in claim 7 wherein said output winding has a center tap, said rectifying means provides a first output positive with respect to said center tap and a second output negative with respect to said center tap, and said feedback means includes first sensing means for sensing a change in said first output voltage, second sensing means for sensing a change in said second output voltage and switch control means responsive to both said first and second sensing means for controlling the operation of said switching means.

* * * * *